3,013,947
ANTIBIOTIC PRODUCTION

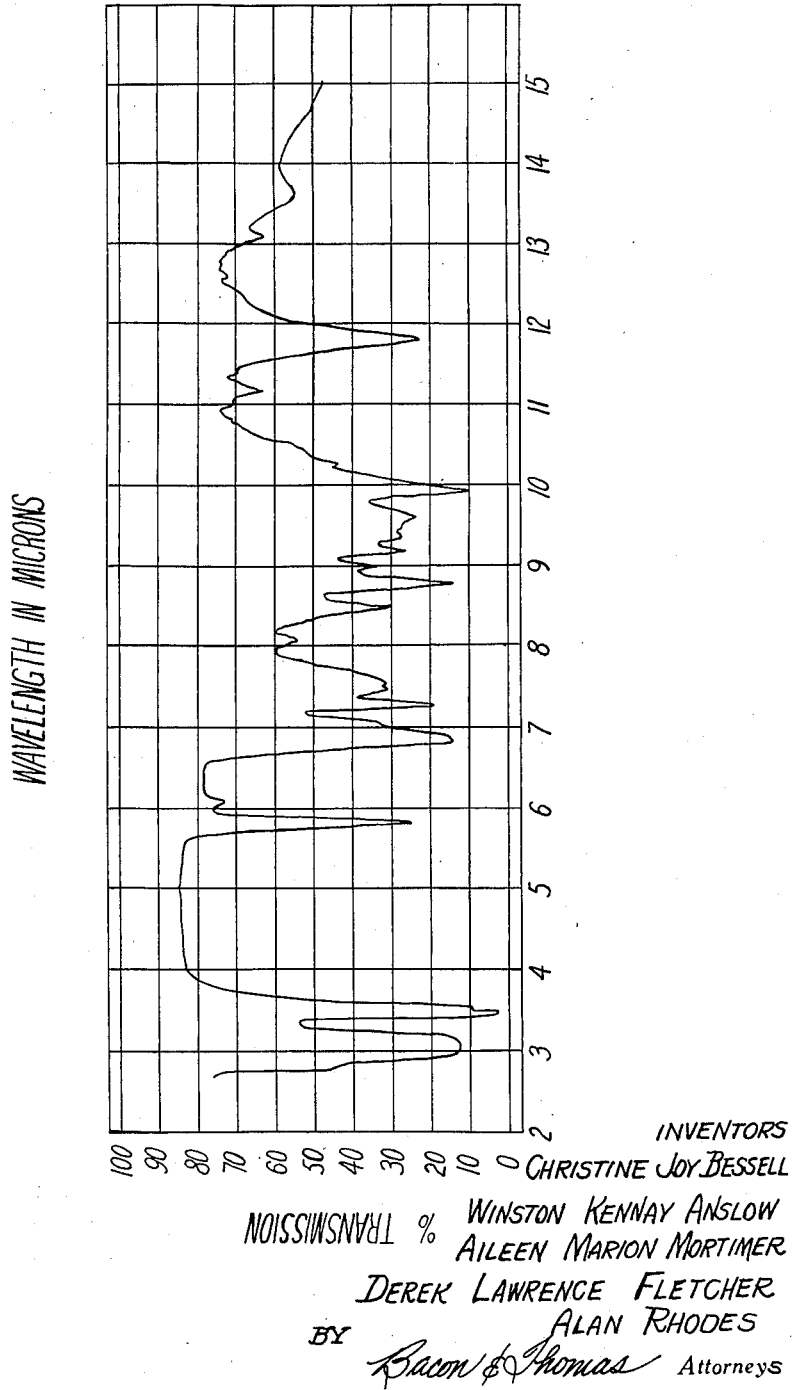

Christine Joy Bessell, Stoke Poges, Winston Kennay Anslow, Slough, Aileen Marion Mortimer, Selly Oak, Birmingham, Derek Lawrence Fletcher, Stoke Poges, and Alan Rhodes, Bracknell, England, assignors to Glaxo Laboratories Limited, Greenford, England, a British company
Filed June 14, 1960, Ser. No. 36,058
12 Claims. (Cl. 195—80)

This invention is concerned with the production of an important antifungal antibiotic which we have designated "lagosin." The antibiotic lagosin is believed to be identical with the antibiotic designated Pentamycin which is described in the Journal of Antibiotics, Series A, 1958, pages 26–29. Pentamycin is described as being produced by the culture of *Streptomyces penticus*. For convenience the antibiotic with which this invention is concerned will continue herein to be termed "lagosin."

We have found that lagosin may be obtained in advantageous manner by the aerobic cultivation of an organism newly discovered by us which we have identified as belonging to the genus Streptomyces. This organism, which is isolated from a soil sample taken in Nigeria has been designated *Streptomyces roseo-luteus* by which name it will be referred to hereinafter. Cultures of the organism *Streptomyces roseo-luteus* have been deposited in the collection of the North Regional Research Laboratory, Peoria, Illinois, United States of America, where it has been assigned the number NRRL 2776. It has also been deposited in the National Collection of Industrial Bacteria at the National Chemical Laboratory, Teddington, England, where it has been assigned the number N.C.I.B. 8984. The use of the new organism enables lagosin to be produced in good yield and in an economic manner.

Since the structure of lagosin is at present undetermined it is first necessary to describe its characteristics. Some characteristics are described in the literature above referred to but for completeness we now set out the full characteristics we have observed.

THE CHARACTERISTICS AND PROPERTIES OF LAGOSIN

Lagosin is a very pale yellow in colour and crystallizes in soft needles from methanol, M.P. (uncorrected), 230–240° C. (dec.). The substance has a specific rotation of $[\alpha]_D^{20} = -160°$ (c., 0.2 in MeOH). It gives a bluish-violet colour with cold, concentrated sulphuric acid, which colour is stable for 24 hours. Lagosin is sparingly soluble in water, slightly soluble in methanol, ethanol, butanol; readily soluble in dimethylformamide, glacial acetic acid and pyridine. It is insoluble in chloroform trichloroethylene, ether and petroleum ethers.

Microanalysis of lagosin gives C, 61.25%; H, 9.12%; N, nil. On hydrogenation lagosin gives a derivative, M.P. 156–7°, $[\alpha]_D^{20} + 3.5°$ (c., 1.98 in MeOH), crystallographic determination of molecular weight, 810±15, which indicates the empirical formula for lagosin to be $C_{41}H_{66-70}O_{14}$ and for the hydrogenation product, $C_{41}H_{78-80}O_{14}$. $C_{41}H_{68}O_{14}$ requires C, 62.73%; H, 8.73%.

We have established a standard of activity for lagosin by assigning to an early partially pure isolate an activity of 1000 units/mgm. Crystalline lagosin in the purest form obtained by us has an activity on this scale of 4950 units/mgm. *Saccharomyces cerevisiae* NCTC4614 was used as standard test organism and assays are conducted by the agar cup plate method.

A solution of lagosin in methanol exhibits an ultra-violet absorption spectrum similar to the polyene antibiotics filipin (Whitfield, Brock, Ammann, Gottlieb and Carter, J. Amer. Chem. Soc. (1955), 77, 4799) and fungichromin (Tytell, McCarthy, Fisher, Bolhofer and Charney, Antibiotics Annual, 1954–55, p. 716), with three characteristic maxima of $$E_{1cm}^{1\%} 1475 \text{ at } 357 \text{ m}\mu$$

1490 at 339 m$\mu$, and 927 at 323 m$\mu$; a shoulder appears at 308 m$\mu$.

A nujol-mull of lagosin gives a characteristic infra-red absorption spectrum, shown in the accompanying drawing, which is similar to that given by filipin and by fungichromin; strong absorption bands are shown at 3580 (2.79$\mu$), 3360 (2.98$\mu$), 2900 (3.45$\mu$), 2840 (3.52$\mu$), 1716 (5.83$\mu$), 1462 (6.84$\mu$), 1374 (7.28$\mu$), 1138 (8.79$\mu$), 1040 (9.61$\mu$), 1008 (9.93$\mu$) and 846 cm.$^{-1}$ (11.82$\mu$), medium absorption bands at 1340 (7.46$\mu$), 1326 (7.54$\mu$), 1178 (8.48$\mu$), 1088 (9.19$\mu$), 1068 (9.36$\mu$), and 722 cm.$^{-1}$ (13.85$\mu$), and weak absorption bands at 1645 (6.08$\mu$), 1238 (8.08$\mu$), 1110 (9.01$\mu$), 975 (10.26$\mu$), 896 (11.16$\mu$), 805 (12.42$\mu$) and 764 cm.$^{-1}$ (13.09$\mu$). Lagosin is differentiated from filipin by the fact that the bands at 1178 (8.48$\mu$), 1088 (9.19$\mu$) and 1040 cm.$^{-1}$ (9.61$\mu$) are about 25% weaker and the band at 1068 cm.$^{-1}$ (9.36$\mu$) about 50% stronger than the corresponding bands in the filipin spectrum. It is differentiated from fungichromin by the absence of the band at 1587 cm.$^{-1}$ (6.30$\mu$) shown by fungichromin and by possessing a band at 1326 cm.$^{-1}$ (7.54$\mu$) not shown by fungichromin.

Lagosin appears to be distinguished from fungichromin and filipin by a number of characteristic differences. Thus, lagosin has an empirical formula of $C_{41}H_{66-70}O_{14}$ whereas fungichromin has an empirical formula of $C_{35}H_{60}O_{13}$ and filipin an empirical formula of $C_{30}H_{50}O_{10}$. The melting points are different, lagosin having an M.P. of 230–240° C., fungichromin and M.P. of 205–210° C. and filipin an M.P. of 195–205° C. In the U.V. the ratios of the $$E_{1cm}^{1\%} \text{ maxima}$$

at 357m$\mu$ and 339m$\mu$ of lagosin and fungichromin are different; for lagosin the ratio is 1:1 whereas for fungichromin 1.1:1. Filipin is converted to a colourless degradation product by methanol at 4° C.; no such change occurs with lagosin.

Lagosin, both as a solid and in solution is sensitive to light. The solid becomes a deeper yellow and finally a pale buff colour. Solutions (50 $\mu$g./ml. in ethanol) showed no loss when stored in the dark at room temperature for five weeks.

The microbiological spectrum of lagosin was determined by reference to the minimal concentration required completely to inhibit the growth of certain phytopathogenic fungi. Partly purified material assaying at 1760 u./mgm. dissolved in methanol and diluted with water to give a methanol concentration of 0.06–0.25%, was used. The results were as follows:

| Species | Type of Inoculum: M=Mycelial, S=Spores | Minimal Inhibitory Concentration in Units/ml. |
|---|---|---|
| *Alternaria solani* | S | 70 |
| *Botrytis allii* | S | 17.5 |
| *Botrytis fabae* | S | 17.5 |
| *Cladosporium fulvum* | S | 70 |
| *Clasterosporium carpophilum* | S | 70 |
| *Corticium solani* | M | 17.5 |
| *Diplodia natalensis* | M | 70 |
| *Elsinoe ampelina* | M | 35 |
| *Fusarium coerulcum* | S | 70 |
| *Fusarium culmorum* | S | 17.5 |
| *Fusarium nivale* | S | 35 |
| *Glomerella cingulata* | M | 70 |
| Do | S | 35 |
| *Sclerotinia camellia* | M | 70 |
| *Stereum purporeum* | M | 70 |
| *Verticillium albo-atrum* | M | 70 |
| Do | S | 17.5 |
| *Verticillium cinarescens* | M | 17.5 |
| Do | S | 70 |

Lagosin is active against a range of fungi and yeasts at low concentrations as is shown in the following table:

| Species | Minimum Inhibitory Conc., µg./ml. |
|---|---|
| Saccharomyces cerevisiae | 1 |
| Riesling wine yeast NCYC 463 | 0.3 |
| Champagne Moussec strain NCYC 482 | 0.3 |
| Californian wine yeast NCYC 177 | 0.3 |
| Hungarian wine yeast NCYC 104 | 0.3 |
| Flor yeast Jerez 2, NCYC 429 | 0.2 |
| Solacz wine yeast | 0.6 |
| Rabka wine yeast | 0.3 |
| Monpost wine yeast | 0.3 |
| Sauterne wine yeast | 0.6 |
| Tokay wine yeast | 0.6 |
| Torulopsis utilis | 1 |
| Rhodotorula gracilis | 0.5 |
| Candida albicans | 0.8–2 |
| Trichophyton mentagrophytes | 5 |
| Trichophyton interdigitale | 12.5 |
| Aspergillus niger | 2 |
| Fusarium culmorum | 6 |
| Fusarium nivale | 12 |
| Glomerella cingulata | 14 |
| Mucor racemosus | 5 |
| Penicillium notatum | 0.6 |
| Penicillin patulum | 1.75 |
| Scopulariopsis brevicaule | 0.6 |
| Trichomonas vaginalis | 1 |

The toxicity of lagosin to mammals on oral administration is low, the $LD_{50}$ being 2100 mg./kg. body weight for mice and 1750 mg./kg. for rats. Lagosin shows a substantially complete absence of phytotoxicity, whether applied to roots or foliage of, for example, the rose, tomato, dwarf bean and antirrhinum.

The antibiotic lagosin has a wide field of application as it is generally useful in inhibiting or controlling the growth of pathogenic and undesirable yeasts and fungi.

THE CHARACTERISTICS OF *STREPTOMYCES ROSEO-LUTEUS*

When first isolated from soil, *Streptomyces roseo-luteus* was grown on malt agar plates and sections of the colonies transferred to plates seeded with various fungi. Zones of inhibition were observed in *Candida albicans, Saccharomyces cerevisiae, Aspergillus niger* and *Trichophyton mentagrophytes*.

*Streptomyces roseo-luteus* grows in the form of a much-branched mycleium with characteristic aerial mycelium and conidiospores formed in chains. It is aerobic and mesophilic. Its growth characteristics vary somewhat depending on the medium on which it is grown. The growth characteristics on the media mentioned below are given by way of example only:

*Asparagine dextrose agar.*—Good growth; vegetative mycelium creamy white; profuse aerial mycelium white becoming light vinaceous fawn; the reverse of the colony empire yellow deepening to yellow chrome with age; a bright yellow pigment diffused through the agar.

*Yeast extract agar.*—Vegetative mycelium orange becoming rufous or apricot orange with age; aerial mycelium white and at first scant; a soluble golden pigment diffused through the agar.

*Bennett's agar.*—Aerial mycelium abundant, white becoming pinkish grey; reverse colony light cadmium; a yellow pigment diffused through the agar.

*Casein agar.*—Aerial mycelium abundant, white becoming pinkish grey, then yellow and finally at 24 days a greenish grey; the reverse of the colony was bright orange-chrome and a golden pigment diffused from the colony; the casein around the colony was cleared.

*Calcium malate agar.*—Very poor growth; colonies smooth and cream coloured; some yellow pigment diffused through the agar.

*Tyrosine agar.*—Vegetative mycelium primuline yellow in colour; aerial mycelium sparse and white; no decomposition of tyrosine at 24 days.

*Cellulose agar.*—No appreciable growth at 24 days.

*Starch agar.*—Sparse cottony growth even at 24 days; aerial mycelium white becoming vinaceous buff.

*Czapek Dox agar.*—Growth sparse; initially cottony and white, becoming vinaceous fawn.

*Synthetic agar with dextrose.*—Good growth; aerial mycelium brownish pink; a bright yellow pigment diffused through the agar.

*Litmus milk.*—Peptonised with an acid reaction; heavy growth at surface covering all but centre of tube.

*Potato plug.*—Vegetative mycelium ochraceous orange becoming cinnamon brown; aerial mycelium maize to baryta yellow; a soluble yellow pigment diffused through the plug.

*Gelatin stab.*—Discrete spherical colonies grew in the stab; liquefaction only after 5 weeks incubation.

*Nitrate broth.*—No nitrite formed; nitrate still present after 24 days.

*Glucose nutrient broth.*—Thin ring of white growth at the surface and floccular growth at the bottom of the tube.

All colour descriptions referred to above conform to Ridgeway, Colour standards and Nomenclature, Washington, 1912.

The morphology of *Streptomyces roseo-luteus* was studied by growing it on cellophane discs on Bennett's agar and on asparagine-dextrose agar, the organism being examined after 10 days incubation. On Bennett's agar the spores were elliptical and borne in long closely spiralled chains, whilst on asparagine-dextrose agar the spores were oval to elliptical and borne in long chains loosely spiralled. The average spore size ranges from about 1.3–1.7$\mu$ with an average size of about 1.5$\mu$.

The ability of *Streptomyces roseo-luteus* to utilise various carbon compounds was tested under the conditions described by Pridham, T. G. and Gottlieb D. (J. Bact., 1948, 56 (1), 113).

The following compounds were readily utilised:

Arabinose, salicin, raffinose, mannitol, sorbitol, xylose, trehalose, lactose, maltose, melibiose and dextrose.

The following compounds were not utilised and supported very sparse growth:

Erythritol, adonitol, aesculin, rhamnose, inulin, sucrose, sodium citrate, sodium acetate, fructose, dextran, sorbose and melezitose.

*Streptomyces roseo-luteus* is morphologically distinguished from other Streptomyces of which we are at present aware, inter alia, by the following characteristics, namely, the vinaceous fawn colour of the aerial mycelium and the production of a bright yellow soluble pigment on both organic and synthetic media, the peptonisation of milk and the very slow liquefaction of gelatine.

Following Bergey's Manual of Determinative Bacteriology *Streptomyces roseo-luteus* appears to fall in Group IA5a[2] or IA5a[3] of that manual. By comparison *Streptomyces penticus* appears to be characterised by the production of a soluble brown pigment in organic media and thus falls in the broad group Ib of the Bergey Classification; *Streptomyces penticus* is also said to be very similar to *Streptomyces rubireticuli*, which also falls into group Ib of Bergey and from which *Streptomyces roseo-luteus* is markedly different.

THE CULTIVATION OF *STREPTOMYCES ROSEO-LUTEUS* TO YIELD CRUDE LAGOSIN

Lagosin is produced by the aerobic culture of *Streptomyces roseo-luteus* in or on a medium capable of supporting the growth thereof. Suitable media are those generally used for the culture of moulds of the genus Streptomyces, and should basically contain one or more assimilable sources of nitrogen and an assimilable source of carbon and energy, and nutrient salts. The culture is preferably conducted under submerged aerobic conditions.

It will be understood by those skilled in the art that the organism *Streptomyces roseo-luteus* is capable of mutation to mutant strains also capable of yielding lagosin. It is thus the practice in the antibiotic industry to produce mutant strains of antibiotic-producing organisms for the purpose of obtaining improved yields and/or more economic production. The present invention thus includes within its scope the use of lagosin-producing mutants of *Streptomyces roseo-luteus* for the production of the antibiotic.

The source of nitrogen is preferably in the form of complex organic material such as oatmeal, peptone, soya meal, maize meal, corn steep liquor, meat extract or a casein digest. Frequently such complex sources of nitrogen will be found to contain also the nutrient salts required by the organism. The source of carbon and energy may for example be carbohydrate assimilable by the mould, for example, glucose, lactose, starch, or assimilable oils or fats e.g. palm oil, maize oil or lard oil; glycerol and palmitic acid are also suitable. Such compounds may be already present in the nitrogen source or may be added to the culture media separately.

It should be noted that the presence of palm oil, maize oil or lard oil or palmitic acid to the culture media results in considerable increase in the yield of lagosin, the yield being some two to four times greater than that achieved using the same medium without one of these constituents. The palm oil, maize oil, lard oil or palmitic acid is preferably added in an amount of from 2.5–7.5%, advantageously approximately 5%.

Examples of suitable media for use in the process of this invention are the following:

| Oatmeal medium | | Soya medium | |
| --- | --- | --- | --- |
| | G. | | G. |
| Oatmeal | 25 | Soya flour | 30 |
| Chalk | 20 | Distiller's solubles | 7.5 |
| Dextrose | 5 | Sodium chloride | 2.5 |
| Dist. water to 1 l. pH 6.8±0.1. | | Dist. water to 1 l. pH 7.6±0.1. | |

| Potato-meat medium | | Glycerol-meat medium | |
| --- | --- | --- | --- |
| Tryptone, g | 5 | Glycerol, cc | 20.0 |
| Soluble starch, g | 10 | Peptone, g | 10 |
| Difco beef extract, g | 3 | Sodium chloride, g | 10 |
| Dextrose, g | 2 | Lab Lemco, g | 5 |
| K₂HPO₄, g | 1.2 | K₂HPO₄, g | 5 |
| KH₂PO₄, g | 0.8 | | |
| Ferrous sulphate (0.1% aqueous solution), ml | 1.0 | Distilled water to 1 l. | |
| Potato extract to 1 l. pH 6.8±0.1. | | pH 6.9±0.1. | |

The following two media have been found to be particularly satisfactory for large-scale production.

Medium 1: Percent
    Oatflour _____ 3
    Whey powder _____ 3
    Chalk _____ 1
    Glucose _____ 0.75
(pH adjusted to 6.9–7.0 with sodium hydroxide; sterilized 45 min. at 120° C.)

Medium 2: Percent
    Oatflour _____ 3
    Whey powder _____ 3
    Palm oil _____ 5
    Chalk _____ 1
    Glucose _____ 0.75
(pH adjusted to 6.9–7.0 with sodium hydroxide; sterilized 45 min. at 120° C.)

In these media oatflour may be replaced by maize meal, soya meal or corn steep liquor but we have found that higher lagosin titres are obtained if oatflour is used. Palm oil, maize oil, lard oil or palmitic acid may also be added to these media to increase the titre of lagosin, as mentioned above.

It will be clear to those skilled in the art that media other than those mentioned above can be used, and whether any medium will support the growth of *Streptomyces roseo-luteus* for the production of lagosin can readily be determined by trial fermentation.

In order to produce lagosin on a large scale, spores of *Streptomyces roseso-luteus* (which can be preserved by lyophilisation in dextran or soil) can, for example be transferred to a suitable glycerol-meat medium of the type detailed below (40 ml. per 250 ml. flask or 500 ml. per 2 l. flask) and incubated for 48 hours on a rotary shaker at 29° C. In this way a heavy mycelial growth is developed.

This vegetative inoculum is then used to inoculate shake flasks or stirred vessels containing a development medium, for example:

Percent
Glycerol _____ 5
Meat extract _____ 1
Casein digest _____ 1
Sodium chloride _____ 0.5
(pH 6.8–7.0; sterilized 30 min. at 120° C.)

Percent
Glucose _____ 1
Meat extract _____ 0.3
Casein digest _____ 1
(pH 6.8–7.0; sterilized 30 min. at 120° C.)

In turn this is used to inoculate shake flasks or stirred vessels containing the production medium, for example medium 1 or 2 set out above.

The fermentation may be conducted at any convenient temperature which does not inhibit the growth of *Streptomyces roseo-luteus* for example between 20° C. and 36° C. preferably between 28° and 32° C. In order to ensure maximum titre good aeration is necessary; maximum titres are generally achieved after seven or eight days fermentation.

THE ISOLATION AND PURIFICATION OF LAGOSIN

Lagosin is contained in both the mycelium and in the culture broth, a far larger proportion of the total lagosin present being in the mycelium. It can be extracted from either the culture broth or the mycelium by means of a suitable organic solvent, for example butanol, amyl alcohol, ethyl acetate and butyl acetate, of which butanol is preferred. On the addition of ether to the butanolic extract, after it has been evaporated to a small volume, crude lagosin precipitates, and can be filtered off. After washing in ether it can be dried in vacuo, to give an orange-yellow solid which, in general, assays between 1,000 and 2,000 u./mgm.

Further purification of the product can be effected in any convenient manner. Thus, the crude material may be subjected to a further washing with ether, and then washed with petroleum ether and dissolved in warm methanol. Evaporation to about one-third volume and chilling gives a pale yellow precipitate assaying at about 3,000 u./mgm.

In an alternative method the crude material may be washed repeatedly with water until no further colour is removed. After drying, the product is dissolved in warm methanol, concentrated to about three-quarters volume and then allowed to stand overnight. Pale yellow solid having a potency of about 3500 u./mgm. is deposited.

In a preferred method of operation the broth is filtered on a kieselguhr pre-coated filter and the mycelial solid extracted twice with n-butanol. The combined butanol extracts are then evaporated in vacuo to a small volume and then, by the addition of water and continued evaporation, the butanol entirely replaced by water. The crude solid is collected by centrifugation, washed with ether and dried. This material is extracted in a soxhlet with methanol, the purified lagosin separating from the extract on standing as a pale yellow semi-crystalline mass assaying about 4000 u./mgm. On recrystallisation from methanol the pure compound is obtained in cushions of soft, very pale yellow needles, assaying about 4950 u./mgm.

For the better understanding of the invention the following examples are given by way of illustration only:

Example 1

A culture of *Streptomyces roseo-luteus* was grown on a Bennett's agar blake bottle. After incubation at 28° C. for 7 days a scrape was taken from a well grown blake bottle and transferred into a conical flask containing 40 ml. of glycerol meat medium and shaken at 28° C. for 2 days. 10 ml. of this was used to inoculate 400 ml. glycerol-meat medium contained in a round-bottomed flask and shaken for 48 hours by which time the growth was prolific.

The contents of two such flasks were used to inoculate 100–150 litres of sterile development medium:

| | Percent |
|---|---|
| Glycerol | 5.0 |
| Meat extract | 1.0 |
| Casein digest | 1.0 |
| Sodium chloride | 0.5 | pH adjusted to 5.8–7.0. (Sterilised for 30 minutes at 120° C.)

This was stirred at 350 revolutions per minute (r.p.m.) aerated at 8 cubic feet per minute (c.f.m.) and maintained at a temperature of 28° C. for 24 hours, at the end of which time there was prolific growth.

45 litres of this well grown culture were transferred to 450 litres of sterile "production" medium:

| | Percent |
|---|---|
| Oatflour | 3.0 |
| Light precipitated chalk | 1.0 |
| Whey powder | 3.0 |
| Glucose | 0.75 | pH adjusted to 6.9–7.0 with sodium hydroxide. (Sterilized for 30 minutes at 120° C.)

This was stirred at 350 r.p.m., aerated at 20 c.f.m. and maintained at a temperature of 28° C. for 112 hours. At this time the broth assayed at 4275 u./ml.

2% (w./v.) of kieselguhr was added to 425 litres of the broth containing an estimated 1930 m.u. of lagosin. The mixture was filtered on a rotary filter using a kieselguhr precoat giving 58 kg. of cuttings and 350 litres of filtrate containing an estimated 105 m.u. of lagosin (by assay).

The cuttings were eluted with butanol, first with 100 litres from which 70 litres were recovered by decantation, secondly with 70 litres from which 60 litres were recovered, thirdly with 50 litres from which 40 litres were recovered and finally with 50 litres from which all the solvent was recovered. The total quantity of lagosin in the combined butanol eluates was 1040 m.u. (i.e. 53.8% of the original total by assay).

The combined eluates were concentrated under vacuum to approximately 6 litres and then water added so as to replace the evaporating butanol. The aqueous suspension was mixed with ether to remove the red oil and filtered. The solid was then re-washed with ether completely to remove a red oil which was present. The solid was then extracted in a soxhlet with methanol, the lagosin which separated being removed from the flask at periodic intervals to give a total of 247 g. of lagosin approximately 75% pure.

To remove impurities, 140 g. of this material, approximately 75% pure was extracted in a soxhlet for 2 hours with chloroform, air dried, then extracted for 2 hours with petroleum ether, air dried, and then for 2 hours with ethyl ether. The solid was finally air dried.

This solid was re-extracted in a soxhlet with methanol for 8 hours. On cooling the methanol overnight 5.75 g. of pure lagosin were obtained. By refluxing the solid remaining in the soxhlet thimble for 1 hour with the mother liquor from above, filtering and allowing to stand overnight, a further 25 g. were obtained.

Example 2

The beneficial effect on the production of lagosin by the addition of palm oil, lard oil or palmitic acid was shown by the following experiment:

Twelve fermenters each containing three litres of production medium as described in Example 1 were set up. To three was added 5% palm oil, to another three 5% lard oil and to another three 5% palmitic acid. The remaining three had no addition and served as "controls." The following results were obtained, each figure being the average titre, by microbiological assay, of the three fermenters:

| Hours | "Controls" (no addition) u./ml. | Plus 5% Palm oil, u./ml. | Plus 5% Lard oil, u./ml. | Plus 5% Palmitic acid, u./ml. |
|---|---|---|---|---|
| 138 | 1,995 | 6,225 | 5,680 | 3,355 |
| 162 | 2,755 | 9,875 | 6,995 | 4,530 |
| 186 | 2,675 | 10,225 | 8,648 | 10,225 |

Example 3

In another experiment maize oil and oleic acid were compared with palm oil and palmitic acid. The following results were obtained which show that maize oil is of value in obtaining good yields of lagosin but oleic acid is of less value.

| Oil added | Maximum titre, u./ml. |
|---|---|
| 5% Palm Oil | 31,700 |
| 5% Maise Oil | 21,300 |
| 5% Palmitic Acid | 21,860 |
| 5% Oleic Acid | 865 |

Example 4

Lagosin may also be extracted without the prior filtration of the mycelium from the broth.

A medium consisting of 4% oatmeal and 5% maize oil was fermented as described in Example 1. Without filtration, 120 litres of the whole broth, containing 373 g. of lagosin, were mixed with a half-volume of n-butanol and the mixture separated centrifugally on two Laval separators in series. The butanolic extracts were evaporated under reduced pressure below 45° C. to about one-fifth and then two volumes of methanol were added with stirring. Unfermented maize oil separated at this stage and was removed by centrifugation. The methanol-butanol solution was clarified by filtration through kieselguhr and then evaporated until the methanol was removed leaving a supersaturated butanolic solution of lagosin. The solution was cooled rapidly with vigorous stirring and allowed to stand at room temperature for an hour. The lagosin was filtered, washed with methanol and then with ether (removing a red oil) and the material dried under vacuum, yielding 190 g. of product.

This application is a continuation-in-part of application Serial No. 815,849 filed May 26, 1959, by Christine Joy Bessell et al., now abandoned.

We claim:

1. A process for the production of lagosin which comprises cultivating an organism selected from the group consisting of *Streptomyces roseo-luteus* (NRRL 2776, NCIB 8984) and a lagosin-producing mutant thereof in a nutrient medium therefor and recovering the lagosin from the medium.

2. A process as claimed in claim 1 in which the culture is conducted under submerged aerobic conditions.

3. A process as claimed in claim 2 in which the medium contains, as a source of assimilable nitrogen, at least one material selected from the group consisting of oatmeal, peptone, soya meal, maize meal, meat extract and casein digest.

4. A process as claimed in claim 2 in which the medium contains, as a source of carbon and energy, at least one material selected from the group consisting of glucose, lactose, starch, palm oil, maize oil, lard oil, glycerol and palmitic acid.

5. A process as claimed in claim 4 in which the medium contains palm oil in an amount of from 2.5–7.5%.

6. A process as claimed in claim 4 in which the medium contains maize oil in an amount of from 2.5–7.5%.

7. A process as claimed in claim 4 in which the medium contains lard oil in an amount of from 2.5–7.5%.

8. A process as claimed in claim 4 in which the medium contains palmitic acid in an amount of from 2.5–7.5%.

9. A process as claimed in claim 2 in which the lagosin is recovered by extracting the lagosin-containing material with an organic solvent for lagosin and recovering the lagosin from the organic solvent.

10. A process as claimed in claim 9 in which the organic solvent is selected from the group consisting of butanol, amyl alcohol, ethyl acetate and butyl acetate.

11. A process as claimed in claim 9 in which the lagosin is recovered from the organic solvent extract by evaporation in vacuo with simultaneous replacement of the solvent water.

12. A process as claimed in claim 9 in which the lagosin is recovered from the organic solvent solution by addition of ether thereto, the precipitated lagosin being redissolved in methanol and allowed to crystallize.

References Cited in the file of this patent

UNITED STATES PATENTS

| | | |
|---|---|---|
| 2,538,721 | Colingsworth | Jan. 16, 1951 |
| 2,779,705 | Peterson et al. | Jan. 29, 1957 |

FOREIGN PATENTS

| | | |
|---|---|---|
| 762,702 | Great Britain | Dec. 5, 1956 |

OTHER REFERENCES

Journal of Antibiotics, Series A, 1958, pages 26 to 29.